United States Patent [19]

Minto

[11] 4,403,643

[45] Sep. 13, 1983

[54] METHOD AND APPARATUS FOR ACCUMULATING, STORING AND RELEASING THERMAL ENERGY

[75] Inventor: Wallace L. Minto, Sarasota, Fla.

[73] Assignee: Sunpower Systems Inc., Sarasota, Fla.

[21] Appl. No.: 276,431

[22] Filed: Jun. 22, 1981

Related U.S. Application Data

[62] Division of Ser. No. 949,593, Oct. 10, 1978, abandoned.

[51] Int. Cl.$^3$ ............................................. F28D 21/00
[52] U.S. Cl. .................................. 165/1; 165/104.12; 165/45; 62/480; 126/436
[58] Field of Search ................. 165/1, 104.12; 62/480, 62/112, 235.1, ; 126/436

[56] References Cited

U.S. PATENT DOCUMENTS 4,051,888 10/1977 Yamada et al. ............ 165/104.12 X
4,272,268  6/1981 Greiner ............................. 62/480 X
4,303,121 12/1981 Pangborn ...................... 165/104.12

FOREIGN PATENT DOCUMENTS 2263474 10/1975 France ................................ 126/436

Primary Examiner—Albert W. Davis, Jr.
Attorney, Agent, or Firm—Wolder, Gross & Yavner

[57] ABSTRACT

A heat storage medium includes a halide or sulfate salt of a divalent or trivalent metal which salt has hydrated and dehydrated states with high heat of hydration. The medium is dehydrated by heating it with heat derived from a natural source such as solar or geothermal energy or from industrial waste heat and the evolved water removed from the medium. The heat is recovered by rehydrating the medium by the addition of water. The medium may be a porous mass, a slurry of the salt in a water immiscible liquid or a suspension of the salt in a gas and it may be dehydrated by source heating the slurry and separating the water or by passing a source heated gas or immiscible liquid through the medium and the heat may be released from the medium by injecting water into the slurry or by passing a water carrying gas or immiscible liquid through the permeable mass. The storage and recovery procedure may be continuous or batch with the medium being recycled.

7 Claims, 2 Drawing Figures

METHOD AND APPARATUS FOR ACCUMULATING, STORING AND RELEASING THERMAL ENERGY

This is a division, of application Ser. No. 949,593 filed Oct. 10, 1978 now abandoned.

BACKGROUND OF THE INVENTION

The present invention relates generally to improvements in the accumulation, storage and dispensing of energy and it relates more particularly to an improved method and apparatus for the accumulation, storage and controlled release of thermal energy in which the thermal energy is stored in a medium which can be maintained in a high potential energy state for indefinitely long periods of time in uninsulated containers and may be controllably liberated at another time or another place and the heat storage medium thereafter recharged or reactivated by the application of heat to the medium.

At the present time, a major problem with the utilization of energy sources in which the rates of energy supply and demand cannot be matched for example heat sources such as solar and geothermal energy is the lack of an economical and efficient means of storing the energy for use at times other than the time of its availability or incidence upon the area of collection. A second major problem is an efficient means of transporting the received heat energy to a remote point of use. Until now, the means used for heat storage involved increasing the temperature of a medium and maintaining that elevated temperature until subsequent use of the heat. This practice requires heavily-insulated containers or conduits, which are expensive and result in large losses of heat energy even during short periods of storage or distribution. The mechanism now in use depends upon the storage of the heat either as sensible heat of a large mass or as latent heat of fusion of some suitable salt or other substance. Only modest amounts of heat may be stored in this manner per unit of mass or volume. The amount of heat stored in the conventional ways is a function of the temperature of the input and overall efficiency of collecting and accumulating the heat energy is inversely proportional to the temperature at which it is stored. For example, the efficiency of solar collector systems falls off very rapidly with increasing temperature because the reradiation of energy increases as the fourth power of the absolute temperature of the collector. Therefore, it is desirable to accumulate thermal energy at relatively low temperatures for improved collector efficiency.

On the other hand, it is usually desirable to utilize heat energy at as high a temperature as possible or desirable for the process in which it is used. In many processes, such as power generation, the efficiency of heat utilization is proportionate to the temperature of the heat source. In currently used methods of heat storage, as sensible heat or latent heat of fusion, the temperature of heat removal from the storage medium can never exceed that temperature at which the heat was stored, and cannot even equal it. Hence, a major difficulty with the present methods of heat storage is the low efficiency in either collecting or using the heat.

SUMMARY OF THE INVENTION

It is a principal object of the present invention to provide an improved method and apparatus for storing energy.

Another object of the present invention is to provide an improved method and apparatus for accumulating and storing thermal energy, and for the controllable release thereof.

Still another object of the present invention is to provide an improved method of accumulating, storing and controllably releasing thermal energy with a storge medium whose temperature does not greatly vary with the amount of releasable energy accumulated therein and which may be indefinitely recycled.

A further object of the present invention is to provide an improved method and apparatus of the above nature which are highly suitable for use with such sources of thermal energy as solar and geothermal energy and which are characterized by being highly reliable and efficient, simple, rugged, relatively compact and inexpensive and of great versatility and adaptability.

The above and other objects of the present invention will become apparent from a reading of the following description taken in conjunction with the accompanying drawing which illustrates preferred embodiments thereof.

In a sense, the present invention contemplates the provision of an improved method and apparatus of handling thermal energy in which a polyvalent metal salt having different states of hydration with a high energy of hydration, advantageously the halide or sulfate salt of a divalent or trivalent metal or mixture thereof is utilized as a heat storage medium. The heat storage medium in a low energy, at least partially hydrated state is heated with the thermal energy derived from a source thereof, such as solar or geothermal energy, to effect dehydration of the storage medium and separate water of hydration therefrom, and thereafter water is added to the heat storage medium to effect hydration of the medium with the evolution of heat which is removed and applied to its desired use. The water of hydration is reversibly removable from its chemical bonding in the heat salt in a stepwise fashion. The degree of dehydration attainable is a direct function of the temperature to which the salt is subjected and an inverse function of the partial pressure of water vapor in the fluid contacting the salt.

Water of hydration is extracted from the salt and removed from its presence and the dehydrated salt may then be stored in closed containers for an indefinite period. The heat potential may be liberated subsequently in a controllable manner by adding water or water vapor to the dehydrated salt. The temperature at which the heat is liberated from the salt is a function of the rate at which the salt is rehydrated and the rate at which heat is removed from the salt for use in another process. The rehydration process is similarly influenced by the temperature and pressure factors that determine dehydration, but in the opposite sense. Thus, the higher the pressure of water vapor, the higher the rate of rehydration and the higher the temperature attainable. The maximum temperature attainable in a controlled reaction is approximately equivalent to the critical point of water of 705° F. (374° C.).

The following table lists examples of polyvalent metal salts which are suitable as the heat storage component of the heat storage medium.

| SALT | BTU/LB. ANHYDROUS SALT | BTU/FT³ |
|---|---|---|
| ALUMINUM FLORIDE | 1080 | 194,000 |
| ALUMINUM CHLORIDE | 1040 | 158,000 |
| BERYLLIUM CHLORIDE | 1000 | 119,000 |
| MAGNESIUM CHLORIDE | 680 | 98,000 |
| ALUMINUM BROMIDE | 575 | 108,000 |
| ALUMINUM SULFATE | 400 | 68,000 |
| FERRIC CHLORIDE | 360 | 63,000 |
| MAGNESIUM SULFATE | 300 | 50,000 |
| CALCIUM CHLORIDE | 280 | 38,000 |
| ZINC CHLORIDE | 210 | 37,000 |

The heat of hydration of the heat storage component should advantageously be at least 200 BTU per pound of the anhydrous polyvalent salt and at least 25,000 BTU per cubic foot.

The partial pressure of the water vapor in equilibrium with these salts increases with increasing temperature in accord with the general equation $P = aT^b$.

Where
P = absolute pressure
T = absolute temperature
a and b = regression coefficients which vary with chemical composition of the salt and its degree of hydration. For example, for the transition between the dihydrate and monohydrate of calcium chloride, the coefficients are:
$a = 1.379083575 \times 10^{-41}$
$b = 14.47406343$
while for the transition between the septahydrate and hexahydrate of magnesium sulfate:
$a = 4.824948835 \times 10^{-67}$
$b = 24.06136849$
where the temperature is in degrees Rankine and the pressure in pounds per square inch absolute.

The hydrated salt may be heated by contact with a heated liquid immiscible with water, such as a hydrocarbon oil. The salt may be suspended in the liquid, or it may be in porous beds permeated by the moving liquid which serves as heat transfer agent and to assist in the removal of water or water vapor from the salt.

In accordance with one embodiment of the present invention, the heat storage salt to be regenerated is dispersed in a moving stream of hot oil and transported as a slurry to a container maintained at a low pressure, whereby water is removed from the slurry as a vapor, cooling the slurry in the process. The slurry is then transported through pipes to a point where it is desired to utilize the heat, at which point water, or water vapor is admixed with the slurry liberating heat, which is removed from the hot slurry by heat exchanger surfaces or similar means.

Alternatively, the potentiated or heat storing salt is separated from suspension in the oil by settling or filtration and the potentiated salt is then stored or shipped in suitable closed containers, while the oil is recycled through a heating means and used to repotentiate additional hydrated salt in either a continuous or batch-wise mode.

In another method embodying the present invention, the hydrated salt is subjected to the action of a heated gas which acts to transfer heat to the salt and sweep away the evolved water vapor. The gas used may be air heated by naturally derived heat such as solar or geothermal or by waste heat sources, or suitable flue gases may be used directly or any other source of low relative humidity gas. The hydrated salt may be in a permeable bed, a fluidized bed, or entrained in the gas as particulate matter. This process may be used either in a continuous flow or batch-wise mode of operation.

Upon rehydration of the potentiated salts, it is important that adequate provision be made to control the rate of rehydration and removal of the heat from the medium at appropriate rates, otherwise excessive temperatures will be produced and heat evolution take place in an uncontrolled fashion. This is particularly true of the completely anhydrous salts, which can react with liquid water with sufficient energy liberation to produce high pressure steam, even though they have been potentiated by prolonged exposure to only moderate temperatures.

The method and apparatus of present invention overcomes the deficiencies of the methods and mechanisms heretofore proposed since:

1. The heat energy may be efficiently absorbed and accumulated at a relatively low temperature.

2. The heat energy is stored in potential form in a medium at ambient temperature which is readily storable or transportable in uninsulated containers or conduits.

3. The heat energy is stored in a relatively high potential form, with stored energy densities as high as or higher than one thousand BTUs per pound or as high as 200,000 BTU per cubic foot of storage medium.

4. Because of the high energy potential of the storage medium, the temperature at which it is liberated is rate dependent, so it is possible to liberate the heat energy at a temperature higher than that at which it was input into the medium. Of course, the quantity of heat liberated can never exceed the quantity input, but the rate of heat output can be greater than the rate of heat input.

5. After liberating the heat therefrom, the storage medium may then be potentiated again by subjecting it to a heat source, and this cycle of potentiation and discharge may be repeated indefinitely.

DESCRIPTION OF THE PREFERRED EMBODIMENTS

Figure 1:
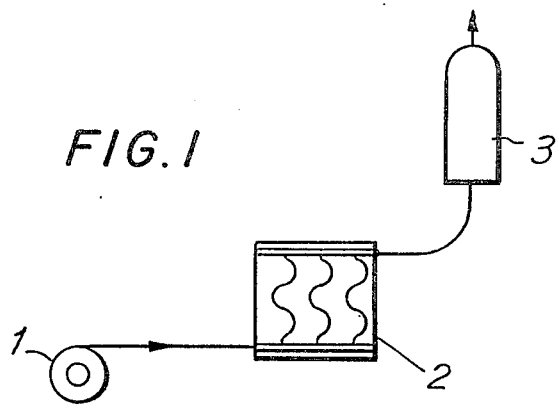
FIG. 1 is a schematic flow diagram of a preferred embodiment of the present invention.

Referring now to the drawings, particularly FIG. 1 thereof which illustrates a preferred embodiment of the present invention, the reference numeral 1 generally designates a blower whose input communicates with the ambient air and whose output is connected through a heating unit 2, such as a solar heating panel, in heat transfer relationship therewith, and then through a container 3 carrying a permeable bed of hydrated polyvalent metal salt having a high heat of hydration, such as a bivalent or trivalent metal halide or sulfate.

Ambient air is taken in by means of the blower 1, thence it is passed through the heater 2 and is thereby raised in temperature, with a corresponding reduction in relative humidity. The hot dry air then is passed through the permeable bed of hydrated salt in container 3 whereby the water of crystallization of the salt passes into the stream of air and increases its relative humidity and the humid air is then vented to the atmosphere or otherwise used. When the salt has reached a satisfactory degree of dehydration, as determined by the temperature and relative humidity of the vented air, the salt carrying container is sealed off and stored for future use. A plurality of containers may be manifolded to a common conduit and connected in parallel or in series with automatic valves actuated by temperature differences so that, as each container reaches the desired degree of dehydration, as evidenced, for example, by a drop to a predetermined difference in temperature between the container input and output or by a rise to a predetermined temperature in the container output, it is automatically valved off and the air flow diverted to those containers which are not yet dehydrated.

As one specific example of the present method with the above apparatus, the container 3 initially contains two thousand pounds of fully hydrated magnesium sulfate $M_gSO_4 \cdot 7H_2O$, commonly known as Epsom Salt. With the ambient air at 75° F. and 50% relative humidity and the heater 2 consisting of a solar collector of 100 square feet area receiving a net heat input of 250 BTUs per hour per square foot, the air passing through the solar heater is warmed to 140° F. With a solar heat input of 25,000 BTU per hour, an ambient air flow of 26.2 lbs. per minute or 359 cubic feet per minute will be warmed to 140° F. dry bulb temperature and 7.5% relative humidity. Experimentation has shown that the various hydrates of magnesium sulfate are in equilibrium with air at 140° F. with the following relative humidities:

| | |
|---|---|
| $MgSO_4 \cdot 6H_2O$ | 113% RH |
| $5H_2O$ | 85% |
| $4H_2O$ | 64% |
| $3H_2O$ | 48% |
| $2H_2O$ | 35% |
| $1H_2O$ | 15% |
| anhydrous | 8.5% |

The flow of warm dry air through the permeable bed of hydrated salt will progressively remove water of hydration from the salt until equilibrium is attained, as evidenced by a small temperature difference between incoming and outgoing air. In the present example, when equilibrium has been reached, approximately 1,000 pounds of water of hydration will have been removed from the 2,000 pounds of hydrated magnesium sulphate, requiring a heat input of 1,421,000 BTUs or about 57 hours of operation of the solar collector.

This stored energy potential may be used for such purposes as drying farm crops, such as grain to be stored. It is well known to those skilled in the art of grain storage that grain should be dried at a relatively low temperature to preserve its viability as seed and to preserve its nutritive value. Yet grain should be dried rapidly to prevent the growth of molds and other contaminants. The drying rate is determined by the difference in vapor pressure of moisture within the kernel and the vapor pressure of moisture in the air, or the relative humidity of the air in contact with the grain.

If air is passed through the permeable bed of dehydrated salt, water vapor in the air will be removed by the salt and the dried air will be heated by the exothermic reaction, liberating about 1370 BTUs per pound of water vapor absorbed. Therefore, as air is passed through a bed of dehydrated salt, whereby it is heated and dried, and then passed through a bed of grain, this very dry air will remove moisture from the grain at a maximum rate without excessive heating of the grain. The air coming from the grain will be lower in temperature and higher in humidity than that entering the grain bed and it may be recirculated through the dehydrated salt bed to warm and redry it. In a closed loop system, the moisture content of the grain is transferred to the salt at a very high rate yet without heating the grain. In the present example, the original one ton of Espom Salts could dry about 5.4 tons of shelled corn from a field condition of 25% moisture down to a level of 12.5% moisture at which it may be stored safely. Because of the low humidity of the air passed through the salt, this drying could be achieved in a few hours without the expenditure of fuel and with no danger of overheating the grain, since the drying force is low relative humidity rather than high dry bulb temperature. The rehydrated salt may then be cycled to remove its combined water as before. By this means, solar energy received over many days may be stored, then used in a matter of hours to perform a highly useful and desirable result.

Considering the heat balances in the mechanisms of the above example, the solar heat input of 1,420,000 BTUs is consumed in these approximate quantities for each of the following purposes:

To raise the temperature of one ton of Epsom Salt from 70° ambient to 140° F. equilibrium temperature requires about 50,000 BTUs.

To supply the energy required to sever the interatomic binding of the water of hydration in the molecules requires about 357,000 BTUs.

To change the phase condition of the water of hydration to a gas requires 1,013,000 BTUs, for a total of 1,420,000 BTUs per ton of fully hydrated salt, which yields approximately 1,000 pounds of the fully dehydrated salt.

To dry 5.4 tons of grain from 25% moisture to 12.5% moisture, 1350 lbs. of water must be vaporized, requiring 1,360,000 BTUs latent heat of vaporization. When the thousand pounds of water vapor from the grain is absorbed by the salt, heat energy is evolved, 1,013,000 BTUs from the change of state of the water vapor and 357,000 BTU from the re-establishment of the intramolecular binding forces, which serve as the thermodynamic driving force to displace the equilibrium moisture content of the grain vs salt system.

Although this theoretical heat balance ignores inevitable losses through sensible heat dissipation, they may be minimized by proper engineering design and are small relative to the substantial drying energy available from the chemical bonding.

Figure 2:
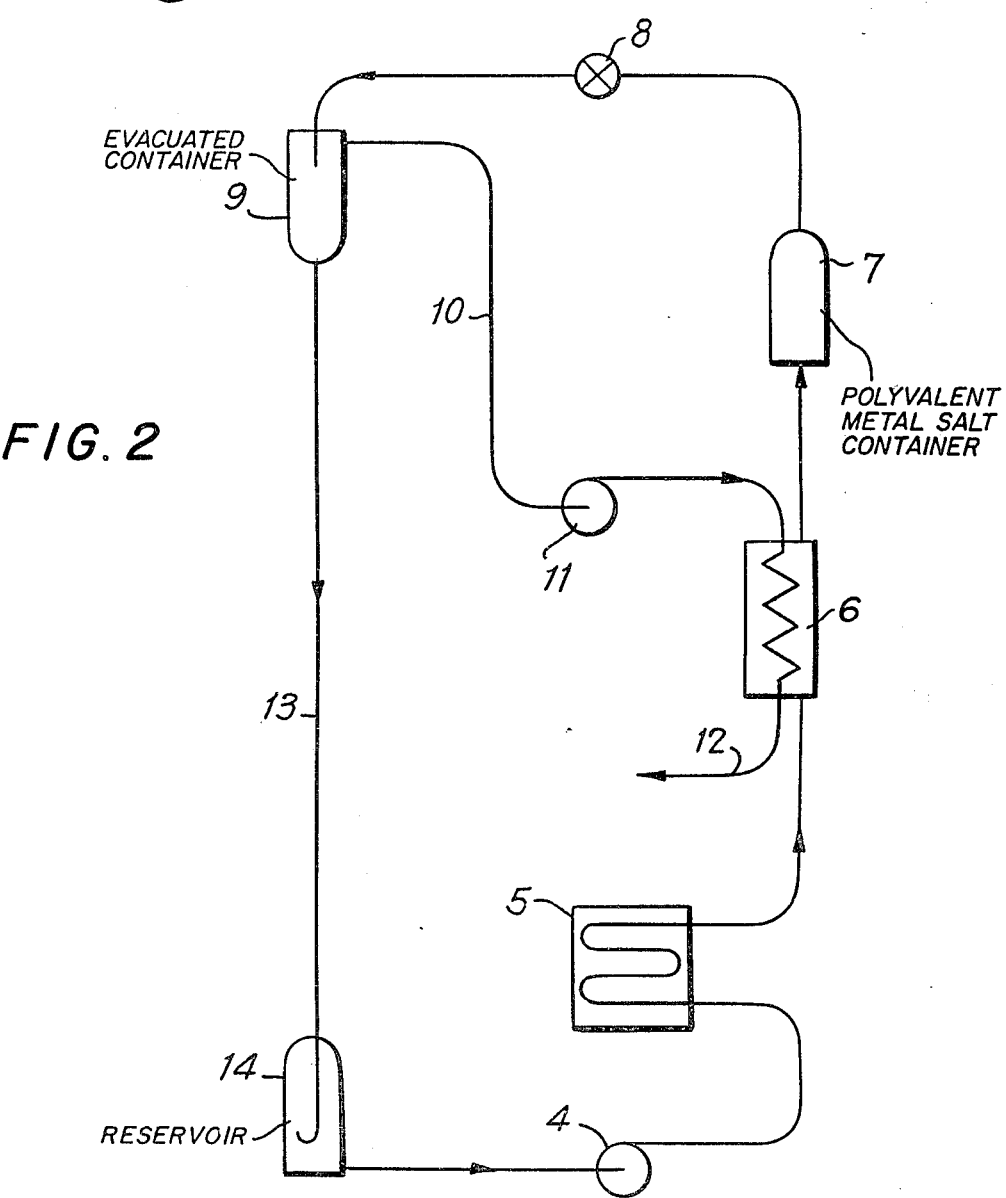
FIG. 2 is a schematic flow diagram of another embodiment of the present invention.

Referring now to FIG. 2 which illustrates another embodiment of the present invention, a fluid circulator 4, for example a pump, circulates a hydrocarbon oil through a heat exchanger 5, where the oil is heated by solar radiation, geothermal or industrial waste heat or the like and next passes through a heat exchanger 6 where it is further heated by the condensation of superheated steam supplied by a compressor 11. The hot oil then passes from heat exchange unit 6 through a permeable bed of hydrated salt in a container 7, such as $MgCl_2 \cdot 6H_2O$ from which it removes water of crystallization. The mixture of oil and water then passes through pressure-reducing valve 8 and the mixture is sprayed into an evacuated container 9, wherein the aqueous part of the mixture is flashed to low pressure steam, cooling the remaining oil. The low pressure steam is transferred via conduit 10 to the compressor 11, where it is adiabatically compressed to greater than atmospheric pressure, being substantially superheated by such compression. The superheated steam is condensed in heat exchanger 6, giving up both its sensible heat and latent heat of condensation to the oil, traversing heat exchanger 6, the condensed water being removed from the system by a conduit 12.

The cooled oil separated from the water in container 9 flows via a barometric leg 13 into reservoir 14, whence it is sucked by the pump 4 to be recirculated through the cycle again.

Theoretically, the energy input required in this cycle to dehydrate the salt is the mechanical work required to drive the compressor 11, since the latent heat of vaporization of the water in container 9 is supplied by the condensation of the water in 11 and this portion of the cycle may have a very high coefficient of performance, resulting in a relatively small energy input. However, because of the inevitable thermal losses in actual equipment, the heat input at 6 is required for maximum efficiency.

It is important to point out that water has a small but significant solubility in hydrocarbon oils and other immiscible liquids. Such dissolved water may be treated in a similar manner to that of the more familiar case of relative humidity in air, in that its state is equivalent to that of a vapor. The solubility limit depends upon the nature of the immiscible liquid and upon the temperature of the solvent, with solubility increasing with temperature, as in the case of relative humidity in air. Above a certain temperature, which is approximately 250° F. with hydrocarbon oils, the water is also entrained in the oil in an unusual form which can best be likened to a supercooled vapor in which the aqueous moiety is a fluid which exhibits properties between those of a liquid and a dry saturated vapor. When this emulsion-solution passes through pressure-reducing valve 8 and into the reduced pressure chamber 9, the water is vaporized and separated from the higher-boiling oil. When the water of hydration has been removed from the salt in container 7, it may then be sealed off and stored at ambient temperature until its heat potential is desired. In FIG. 2, there is shown only a single container for purposes of clarity, but it is obvious that a multiplicity of manifolded containers may be used advantageously.

When it is desired to liberate heat from the dehydrated salt, it is only necessary to pass through the salt a fluid with water dissolved or entrained in an immiscible fluid, which may be either a liquid or gas. The amount of heat liberated will depend upon the phase state of the water of rehydration contacting the salt. If the water is in liquid form, the amount of heat liberated will be those shown in Table 1, but if the water is in a vaporous or dissolved state, the amount of heat liberated will be that shown in Table 1 plus approximately 1,000 BTUs per pound of water absorbed by the salt. In the present example in which magnesium chloride is used, a pound of anhydrous salt will liberate 679 BTUs when treated with liquid water. Since the anhydrous salt will absorb 2.135 pounds of water to achieve its hydrated stage, a total of 2814 BTU will be liberated per pound of anhydrous salt when the water of rehydration is supplied in the vapor phase, or in solution in an immiscible solvent.

The dried immiscible fluid will be heated by the resulting exothermic reaction and may be used to supply heat to any desired process or heat consuming device.

It should be noted that the reaction between water and the halide salts near the top of the table of suitable heat storage salts are sufficiently exothermic to generate high pressure steam, and the addition of water should be carefully regulated with the adequate provision for the removal of the evolved heat at a sufficient rate.

While there have been described and illustrated preferred embodiments of the present invention, it is apparent that numerous alterations, omissions and additions may be made without departing from the spirit thereof.

I claim:

1. The method of handling thermal energy comprising the steps of heating a heat storage medium including a slurry of an at least partially hydrated heat storage water soluble polyvalent metal salt material having relatively hydrated and dehydrated stages dispersed in a water immiscible liquid unreactive with said salt material with thermal energy derived from a source thereof to extract water from and convert said salt material to a water impoverished state, separating from said slurry the water released from said salt material, thereafter adding water to said water impoverished material to effect at least the partial rehydration thereof with the evolution of heat and applying said evolved heat to a heat consuming process.

2. The method of claim 1 wherein said salt material is selected from the class consisting of the halide and sulfate salts of divalent and trivalent metals and mixtures thereof.

3. The method of claim 2 wherein said thermal energy is derived from industrial waste heat.

4. The method of claim 1 wherein said water is added in a vapor state.

5. The method of claim 1 wherein heat is released from the slurry containing the water impoverished salt material by injecting water into said slurry.

6. The method of claim 5 wherein the water impoverished salt material carrying slurry is pipe conveyed to a point remote from the heating of the slurry where said water is injected.

7. An apparatus for handling thermal energy comprising a container in which is disposed a heat storage medium including an at least partially hydrated heat storage water soluble polyvalent metal salt material having relatively hydrated and dehydrated states, a first heat exchange unit heated by thermal energy from a source thereof, means for pumping a hydrocarbon oil fluid through said heat transfer unit to be heated by said thermal energy and then through said storage medium in said container to heat said storage material and separate water therefrom and remove said water from said container, a second heat exchange unit disposed between said storage medium container and said first heat exchange unit, an evaporation chamber having an inlet connected to the output of said container and a liquid outlet and a vapor outlet, a pump connecting said vapor outlet to said second heat exchange unit and means including a liquid accumulating reservoir connecting said liquid outlet to the inlet of said pumping means.

* * * * *